Figure 1:
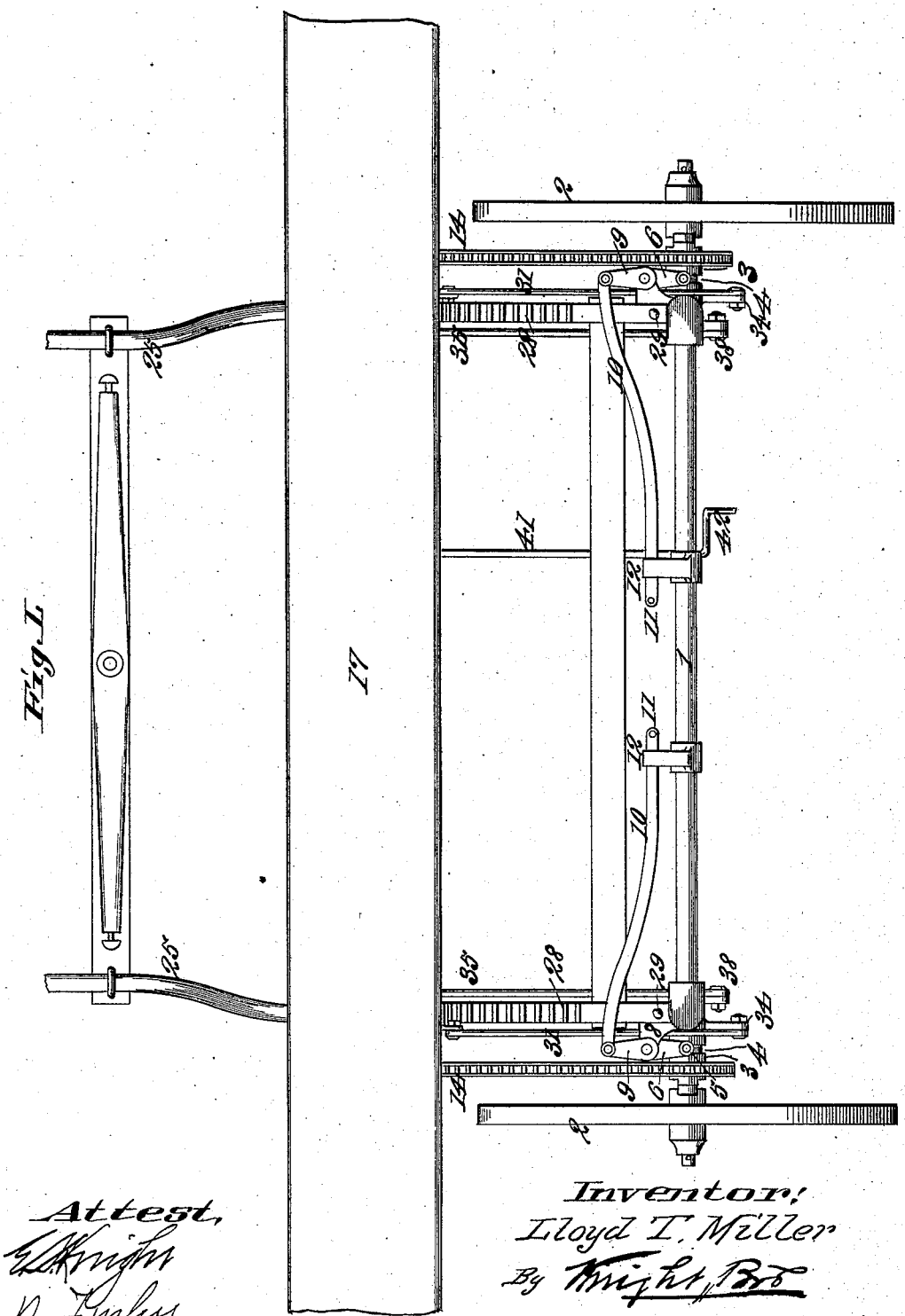

(No Model.) 3 Sheets—Sheet 1.

L. T. MILLER.
COMBINED AGRICULTURAL IMPLEMENT.

No. 577,194. Patented Feb. 16, 1897.

Attest,
E. Knight
N. Finley

Inventor,
Lloyd T. Miller
By Knight Bro.
Attys

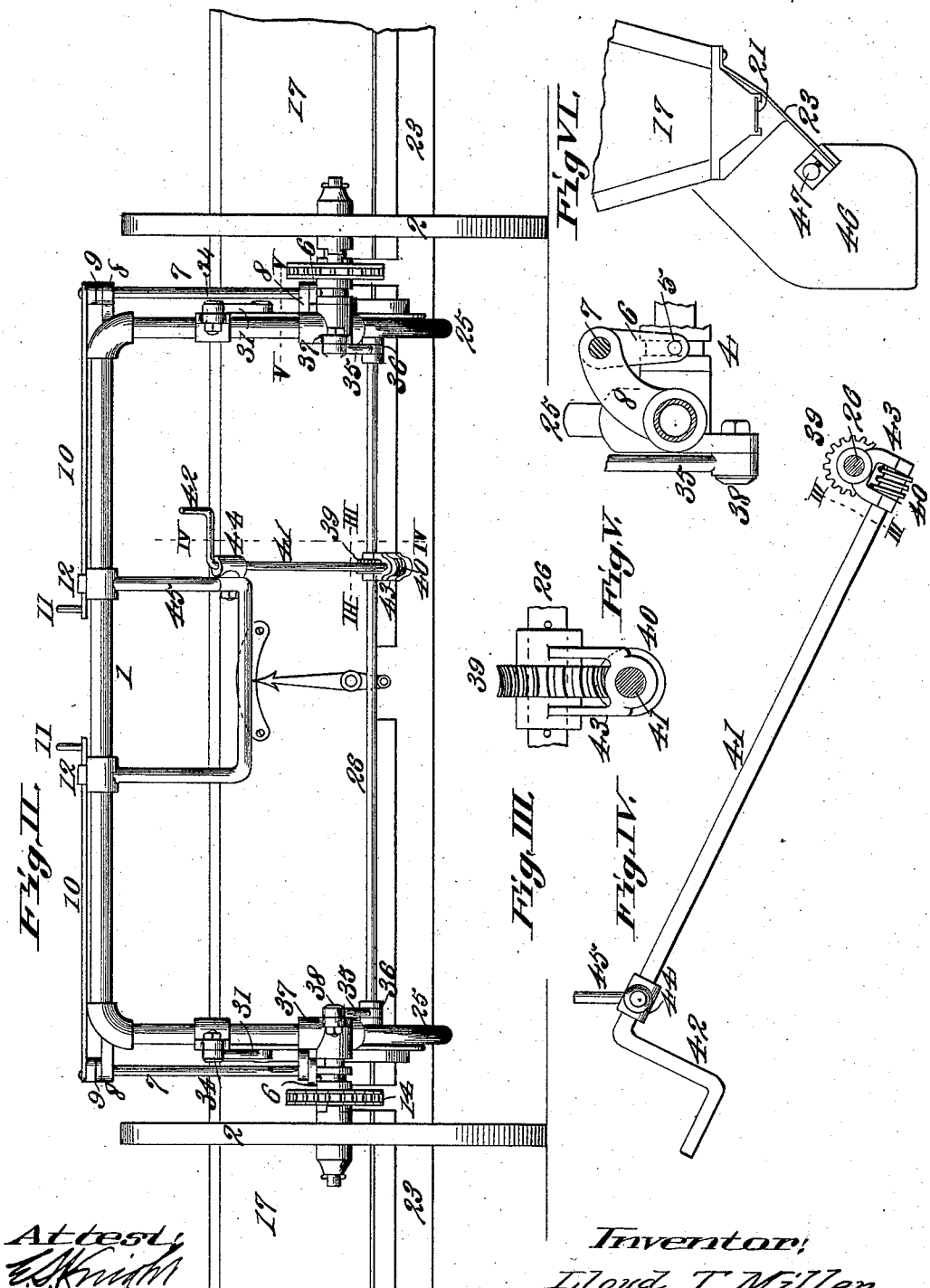

(No Model.) 3 Sheets—Sheet 3.
L. T. MILLER.
COMBINED AGRICULTURAL IMPLEMENT.
No. 577,194. Patented Feb. 16, 1897.
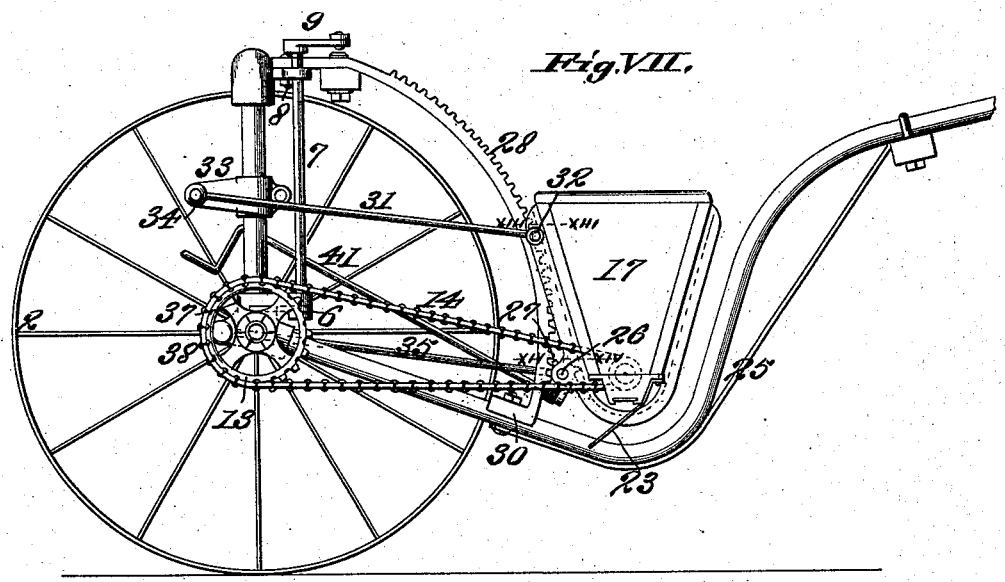
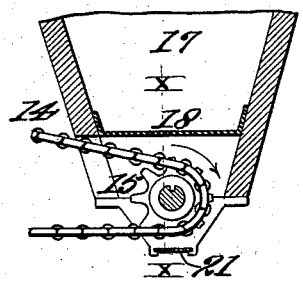
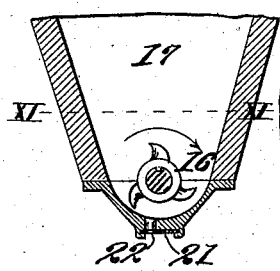
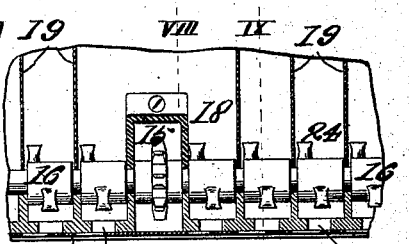
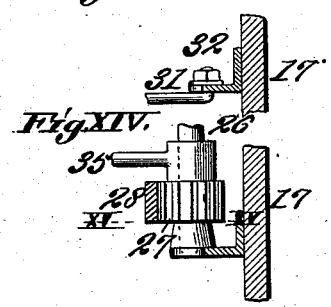
Attest:
E. S. Knight
N. Finley.
Inventor:
Lloyd T. Miller
By Knight Bro
Att'ys

UNITED STATES PATENT OFFICE.

LLOYD T. MILLER, OF CASEYVILLE, ILLINOIS.

COMBINED AGRICULTURAL IMPLEMENT.

SPECIFICATION forming part of Letters Patent No. 577,194, dated February 16, 1897.

Application filed October 3, 1896. Serial No. 607,759. (No model.)

*To all whom it may concern:*

Be it known that I, LLOYD T. MILLER, a citizen of the United States, residing at Caseyville, St. Clair county, in the State of Illinois, have invented a certain new and useful Improvement in Combined Agricultural Implements, of which the following is a full, clear, and exact description, reference being had to the accompanying drawings, forming part of this specification.

My invention relates to a machine for employment in distributing poison-dust upon potato or other plants, or for distributing fertilizer either broadcast or in rows.

The machine is also capable of use for sowing small grains.

My invention consists in features of novelty hereinafter fully described, and pointed out in the claims.

Figure I is a top or plan view of my improved machine, showing it arranged to be moved by horse-power. Fig. II is a detail rear elevation. Fig. III is an enlarged section taken on line III III, Fig. IV, or on the same line, Fig. II, and showing the device for raising and lowering the feed-box. Fig. IV is an enlarged vertical section taken on line IV IV, Fig. II, and showing the device for raising and lowering the feed-box. Fig. V is an enlarged detail horizontal section taken on line V V, Fig. II. Fig. VI is a detail side view showing the feed-box provided with a wind guard or shield. Fig. VII is an end view of the machine. Fig. VIII is a detail vertical section taken on line VIII VIII, Fig. X, and showing the lower part of the feed-box at the point where the feed-shaft is provided with a sprocket-wheel by which the shaft is turned. Fig. IX is a detail section of the lower part of the feed-box, taken on line IX IX, Fig. X. Fig. X is a detail vertical longitudinal section taken on line X X, Fig. III. Fig. XI is a detail horizontal longitudinal section taken on line XI XI, Fig. IX. Fig. XII is a detail view of the feed-slide. Fig. XIII is an enlarged detail section taken on line XIII XIII, Fig. VII. Fig. XIV is a similar view taken on line XIV XIV, Fig. VII. Fig. XV is a detail view, part in elevation and part in section, taken on line XV XV, Fig. XIV.

Referring to the drawings, 1 represents an arched axle provided with ground-wheels 2. Mounted on this axle are sliding clutches 3, adapted to be moved into engagement with the notched hubs of the ground-wheels, as shown in Fig. I. As a means for moving these clutches I have shown them provided with grooves 4 to receive pins 5 (see Figs. I and V) on cranks 6, secured to the lower ends of the rock-shaft 7, that extends to the top of the arched axle 1, and which are secured to the vertical parts of the crank-shaft by means of brackets 8, in which the shafts turn. The upper ends of the rock-shafts are provided with cranks 9, to which bars 10 are connected that extend inwardly to near the center of the machine, where they are provided with hand-pieces 11, and where they are guided by brackets 12, secured to the axle 1. By taking hold of the handpieces 11 and moving them in or out to rock the shafts 7 the clutches 3 are moved out of and into engagement with the notched hubs of the ground-wheels. When the clutches are engaged with the wheels, they are caused to revolve, and each clutch is provided with a sprocket-wheel 13, over which passes a chain belt 14, that also passes around a sprocket-wheel 15, (see Figs. VIII and X,) secured to a feed-shaft 16, located at the bottom of the feed-box 17. The feed-shaft is thus driven by the ground-wheels. The sprocket-wheels 15 are inclosed within housings 18, located within the feed-box 17, as shown in Fig. X, so that the contents of the feed-box do not come in contact with the feed-shaft-propelling mechanism.

The feed-box is divided into a number of compartments by means of partitions 19, and the bottom of each compartment has perforations 20, through which the material passes. The bottom of the feed-box is provided with a slide 21. (See Figs. X and XII.) This slide has a number of perforations 22, made to one side of its center, corresponding with the perforations 20 in the bottom of the feed-box, and when the slide is moved so that these perforations register the contents of the box will pass from the feed-box onto the ground. If it is desired to distribute the contents of the box in rows—as, for instance, in distributing grain—the slide 21 is taken out and reversed, and then inserted again into position. This brings the other side of the slide beneath the perforations 20, and this side of the slide is provided with a less number of perforations 22, as shown in Fig. XII, so that the contents of the box will escape from a part only of the compartments.

The bottom of the feed-box is provided with a deflecting-plate 23, that directs the material onto the ground.

The shaft 16 is provided with a number of teeth or projections 24, that produce a forced feed of the material from the feed-box.

25 represents the thills of the machine, to which the draft-animal is attached.

The feed-box 17 is so arranged and provided with mechanism for arranging it that it may be moved or adjusted to and from the ground to suit existing conditions.

26 represents a shaft journaled to the feed-box and provided with pinions 27, that engage racks 28, secured at their upper ends to the top of the arched axle, as shown at 29, Fig. I, and secured at their lower ends to the thills 25, as shown at 30, Fig. VII. The upper part of the feed-box is connected to the vertical parts of the arched axle by means of rods 31, the rods being pivoted to the feed-box at 32 and to the axle by means of brackets 33, to which the rods are pivoted at 34. The lower part of the feed-box is connected to the axle by means of rods 35, mounted on the shaft 26, as shown at 36, Fig. II, and the other ends of these rods are connected to the crank-axle by means of brackets 37, (see Figs. II and V,) to which the rods are pivoted at 38. By thus connecting the feed-box to the arched axle the box moves in an arc of a circle corresponding to the radius of the racks 28, and at the same time maintains its vertical position.

As a means for moving the box the shaft 26 is provided with a pinion 39, (see Figs. II, III, VII, and XIV,) engaged by a worm 40 on a rod 41, provided with a hand-crank 42. The lower end of the rod 41 is journaled in a box 43, supported on a shaft 26, and the upper end of the rod is journaled in a box 44, connected to a frame 45, secured to the axle 1, as seen in Fig. II. By turning the shaft 26 through means of the rod 41 and its worm 40 the pinions 27 will be made to move in the racks 28 and the feed-box raised and lowered at will, while always maintaining its upright position.

46 represents a wind guard or shield that may be clamped to the deflecting-plate 23 by means of a set-screw 47. This guard is but a thin piece of metal, and as many of them as desired may be clamped along the edge of the plate 23 to prevent the wind blowing across the line of movement of the machine from disturbing the material as it moves from the feed-box to the ground.

It will be observed that the connection between the feed-box and the axle of the machine not only maintains the upright position of the feed-box when raised and lowered, but also maintains a uniform distance between the sprocket-wheels on the axle and the sprocket-wheels on the shaft of the feed-box.

I claim as my invention—

1. In an agricultural implement, in combination with an axle and its ground-wheels forming a support, a feed-box, rods connecting said box to said support, and means for raising and lowering the box, whereby the height of the box may be adjusted without changing its upright position, substantially as set forth.

2. In an agricultural implement, in combination with an axle and its ground-wheels forming a support, a feed-box, an upper and a lower pair of rods connecting said box to said support, racks secured to the support, pinions secured to said box and which engage said racks, and means for turning said pinions, substantially as set forth.

3. In an agricultural implement, in combination with an axle and its ground-wheels forming a support, a feed-box, parallel rods connecting each end of said feed-box to said support, and means for raising and lowering the box, whereby the height of the box may be adjusted without changing its upright position, substantially as set forth.

4. In an agricultural implement, in combination with an axle and its ground-wheels forming a support, a feed-box, parallel rods connecting each end of said feed-box to said support, a shaft provided with pinions and carried by said box, a pair of racks with which said pinions engage, a pinion on said shaft, a worm engaging said pinion, and a crank-rod for operating said worm, substantially as and for the purpose set forth.

5. In an agricultural implement, the combination of an arched axle, ground-wheels journaled to said axle and having notched hubs, sliding clutches fitted on said axles and adapted to engage said hubs, sprocket-wheels carried by said clutches, cranks having pins fitting in grooves formed in said clutches, rock-shafts to which said cranks are secured, cranks secured to the upper ends of said rock-shafts, bars secured to the last-mentioned cranks and provided with handpieces, a feed-box, and chain belts fitting over said sprocket-wheels and passing around sprocket-wheels secured to the feed-shaft of said box, substantially as and for the purpose set forth.

6. In an agricultural implement, the combination of an arched axle, ground-wheels mounted on said axle, a feed-box, endless chain connecting sprocket-wheels on said axle to sprocket-wheels on the shaft of said feed-box, parallel rods connecting said box to said axle, and means for raising and lowering the box whereby the elevation of the box may be adjusted while not changing its position nor affecting the distance between the sprocket-wheels on the axles and the sprocket-wheels on the shaft of the box, substantially as set forth.

LLOYD T. MILLER.

In presence of—
N. FINLEY,
STANLEY STONER.